US009744791B2

(12) United States Patent
Schultze et al.

(10) Patent No.: US 9,744,791 B2
(45) Date of Patent: Aug. 29, 2017

(54) BOOKLET SPINE GUIDANCE SYSTEM IN A BOOKLET PROCESSING MECHANISM

(71) Applicant: DATACARD CORPORATION, Minnetonka, MN (US)

(72) Inventors: Gary Schultze, Savage, MN (US); Dennis J. Warwick, Richfield, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 801 days.

(21) Appl. No.: 13/974,199

(22) Filed: Aug. 23, 2013

(65) Prior Publication Data

US 2014/0056681 A1 Feb. 27, 2014

Related U.S. Application Data

(60) Provisional application No. 61/692,973, filed on Aug. 24, 2012.

(51) Int. Cl.

| | |
|---|---|
| ***B65G 47/22*** | (2006.01) |
| ***B42C 99/00*** | (2006.01) |
| ***B41J 3/28*** | (2006.01) |
| ***B42D 9/00*** | (2006.01) |
| ***B42D 25/41*** | (2014.01) |

(Continued)

(52) U.S. Cl.

CPC ............... *B42C 99/00* (2013.01); *B41J 3/283* (2013.01); *B41J 11/20* (2013.01); *B42D 9/00* (2013.01); *B42D 25/24* (2014.10); *B42D 25/41* (2014.10)

(58) Field of Classification Search

CPC ........ B42C 99/00; B42D 25/24; B42D 25/41; B42D 9/06; B25B 1/04; B25B 1/2468; B25B 11/02

USPC ........................................... 414/777; 101/474

See application file for complete search history.

(56) References Cited

U.S. PATENT DOCUMENTS 2,928,343 A * 3/1960 Mintz ........................... 101/474
3,416,446 A * 12/1968 Baldwin ....................... 101/287

(Continued)

FOREIGN PATENT DOCUMENTS

JP 2002-178663 6/2002
JP 2009-149426 7/2009

(Continued)

OTHER PUBLICATIONS

International Search Report for PCT/US2013/056341, dated Jan. 14, 2014, 3 pages.

(Continued)

*Primary Examiner* — Michael McCullough
*Assistant Examiner* — Lynn Schwenning
(74) *Attorney, Agent, or Firm* — Hamre, Schumann, Mueller & Larson, P.C.

(57) ABSTRACT

A booklet processing mechanism is described that includes a spine guidance system that is configured to hold the area adjacent to the spine of an opened, multiple sheet booklet against a backing plate during processing on a page of the booklet, for example by a laser or during vision verification. The spine guidance system is configured so that it resides closely adjacent to the spine of the booklet, below the field of lasing by the laser or other processing operation, so that it does not interfere with the processing operation.

18 Claims, 8 Drawing Sheets

(51) Int. Cl.

| | |
|---|---|
| ***B42D 25/24*** | (2014.01) |
| ***B41J 11/20*** | (2006.01) |

(56) References Cited

U.S. PATENT DOCUMENTS

| | | | | | |
|---|---|---|---|---|---|
| 3,460,795 | A | * | 8/1969 | Dahlin | A47B 23/044 248/452 |
| 3,603,554 | A | * | 9/1971 | Dickinson, III | A47B 65/00 248/453 |
| 4,184,780 | A | * | 1/1980 | Kurihara | 400/56 |
| 5,118,238 | A | | 6/1992 | Crudo | |
| 6,783,067 | B2 | | 8/2004 | Kreuter et al. | |
| 2003/0063334 | A1 | | 4/2003 | Mandel et al. | |
| 2004/0047009 | A1 | | 3/2004 | Taylor et al. | |
| 2010/0074714 | A1 | | 3/2010 | Oka et al. | |
| 2013/0136521 | A1 | * | 5/2013 | Garcia | 400/642 |

FOREIGN PATENT DOCUMENTS

| | | | | |
|---|---|---|---|---|
| JP | 2011-161914 | | 8/2011 | |
| WO | WO 01/54918 | * | 8/2001 | B42D 15/10 |
| WO | WO 2007/005004 | * | 1/2007 | G06F 7/08 |

OTHER PUBLICATIONS

Written Opinion for PCT/US2013/056341, dated Jan. 13, 2014, 4 pages.

U.S. Appl. No. 61/692,975 entitled Booklet Guide and Clamp System in a Booklet Processing Mechanism filed Aug. 24, 2012.

The extended European Search Report issued in European application No. 13831056.0, dated Apr. 11, 2016, total 10 pages.

* cited by examiner

BOOKLET SPINE GUIDANCE SYSTEM IN A BOOKLET PROCESSING MECHANISM

This application claims the benefit of U.S. Provisional Application No. 61/692,973 filed on Aug. 24, 2012.

FIELD

This disclosure relates to a system for securely holding a multiple sheet booklet, such as a passport, within a booklet processing mechanism, for example a laser personalization mechanism or a vision verification mechanism, during processing of a page of the booklet.

BACKGROUND

The use of a laser to laser a page of a multiple sheet booklet such as a passport is disclosed in U.S. Pat. No. 6,783,067 and can be found in commercial systems such as the PB6500™ passport issuance system available from DataCard Corporation of Minnetonka, Minn.

When lasing a page, it is important that the page be held securely against a backing plate during lasing to ensure the highest quality lasing on the page. When the page is one of a plurality of sheets that are bound along a spine to form a booklet, the area of the page as it nears the spine tends to deflect outwardly when the booklet is opened, and that area can be difficult to retain against the backing plate for proper lasing.

In the case of passports, complicating processing on the booklet, as well as holding the page securely against the backing plate, is that the construction of passports can vary from country to country. These differences include variations in the number of sheets, variations in the dimensions of the booklets such as, for example, variations in the sizes of the outer covers, as well as differences in the materials used to construct the passports which can impact mechanical handling of the passports.

SUMMARY

A booklet processing mechanism is described that includes a spine guidance system that is configured to hold the area adjacent to the spine of a multiple sheet booklet against a backing plate during processing of a page of the booklet. The spine guidance system is configured so that it resides closely adjacent to the spine of the booklet so that it does not interfere with the processing of the page.

The booklet processing mechanism can be any mechanism where a page of a booklet should be securely held during processing of the page. Examples of booklet processing mechanisms include, but are not limited to, a laser processing mechanism where a laser is used to personalize a page, and a vision verification mechanism that is used to verify the quality and/or accuracy of personalization on a page.

One advantage of the booklet processing mechanism is that it can accommodate booklets with various constructions and dimensions. Another advantage is that the booklet can be processed without fully opening the booklet 180 degrees. Rather, the described booklet processing mechanism allows the booklet to be opened to about 90 degrees and processed.

The multiple sheet booklets described herein can be any multiple sheet booklet where a sheet needs to be processed, for example by a laser that is used to lase one or more pages of the booklet once it has been opened to apply data to the page such as text, portrait images, security features, and the like. The data can be personal data that is specific to the intended holder of the booklet. The data could also be non-personal data such as a corporate logo. Therefore, the term "personalization" used herein is intended to encompass both personal data and non-personal data applied by a laser. Examples of multiple sheet booklets include, but are not limited to, any ID-3 sized booklets such as passports and identification booklets, passbooks/bankbooks, and the like.

The booklet processing mechanism incorporating the spine guidance system described herein can be employed on any type of processing system for processing a multiple sheet booklet. Examples of processing systems include modular systems such as the PB6500™ passport issuance system and the system disclosed in U.S. Pat. No. 6,783,067; multi-station processing systems that may not be considered modular but which resemble modular processing systems in performance; desktop processing systems; and the like. Modular and multi-station booklet processing systems are generally configured to process booklets in large volumes, often measured in the hundreds per hour, in a centralized environment. Desktop booklet processing systems are generally configured to process booklets in much smaller volumes, often one at a time, in a decentralized environment.

In one embodiment, a booklet processing mechanism is provided that is configured to process a booklet having a spine. The mechanism includes a backing plate, and a spine guidance system that includes a spine guide. The spine guide is configured to engage a booklet half of the booklet adjacent to the spine to bias the booklet half into engagement with the backing plate. In addition, the spine guide is moveable toward and away from the backing plate, with the spine guide being biased in a direction toward the backing plate, and the spine guide is pivotable about a horizontal axis.

In another embodiment, a booklet processing mechanism is provided that is configured to process a booklet having a spine. The mechanism includes a backing plate, and a spine guidance system that includes a spine guide. The spine guide is configured to engage a booklet half of the booklet adjacent to the spine to bias the booklet half into engagement with the backing plate. In addition, the mechanism includes a horizontal platform, and a cut-out section formed in the horizontal platform, wherein the spine guide is mounted in the cut-out section.

In another embodiment, a passport processing mechanism is provided that is configured to process a passport having a spine. The mechanism includes a backing plate that in use supports a first half of the passport, and a platform that defines a transport path in which during use a second half of the passport is disposed. A spine guidance system is mounted on the platform, and includes a spine guide that is configured to engage the first half of the passport adjacent to the spine to bias the first half into engagement with the backing plate. The spine guide is moveable toward and away from the backing plate, with the spine guide being biased in a direction toward the backing plate, and the spine guide is pivotable about a horizontal axis. In addition, the mechanism includes a processing mechanism that performs a processing operation on the passport.

The spine guide can have any construction that has a low vertical profile so that it resides below the field of the processing mechanism, such as a laser, to avoid obstructing the processing operation, helps to guide a booklet into and from a processing position, accommodates different booklet half thicknesses, biases the portion of the booklet half adjacent to the spine against the backing plate, and when MLI/CLI or 3D lasing capability is provided, can pivot about a vertical axis and a horizontal axis to follow movements of the backing plate.

DRAWINGS

DETAILED DESCRIPTION

Figure 6:
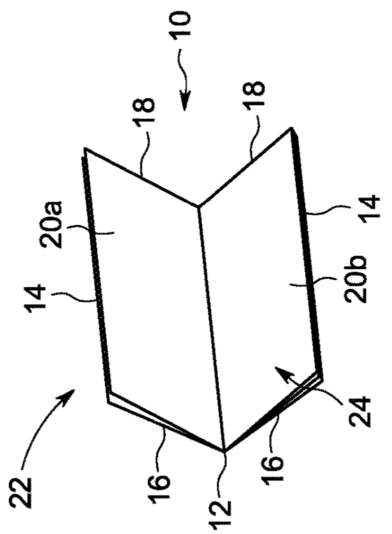
FIG. 6 illustrates a multiple sheet booklet.

With reference initially to FIG. 6, a multiple sheet booklet 10 in an opened configuration is illustrated. The booklet can be any multiple sheet booklet where some form of processing, such as lasing or vision verification, occurs on one or more pages of the booklet once it has been opened. Examples of multiple sheet booklets include, but are not limited to, any ID-3 sized booklets such as passports and identification booklets, passbooks/bankbooks, and the like. In the case of lasing, a laser can be used to apply data to the page such as text, a portrait image(s) or other security features, and the like. Vision verification can be used to verify the accuracy and/or quality of data that has been applied to the page of the booklet.

The booklet 10 includes a plurality of sheets including a front cover, a back cover, and a plurality of intermediate sheets between the front cover and the back cover. The sheets are bound, for example by sewing a stitching thread along one edge to form a spine 12. The edges 14 of the sheets opposite the spine 12 and the opposite side edges 16, 18 are unbound. FIG. 6 shows the booklet 10 opened to two adjacent intermediate sheets 20*a*, 20*b*. Each sheet of the booklet includes two pages that can be referred to as a front or first page and a back or second page. Based on this terminology, in FIG. 6 the front page of the sheet 20*a* faces the back page of the sheet 20*b*.

For sake of convenience, the booklet 10 when opened will be described herein as having a first half 22 that includes the sheet 20*a* and a second half 24 that includes the sheet 20*b*. This is not meant to imply that the same number of sheets is contained in each half 22, 24. Instead, it is to be understood that the number of sheets in each half 22, 24 can be different from one another. Further, when opened, the first half 22 and the second half 24 are oriented generally about 90 degrees relative to one another.

Figure 1:
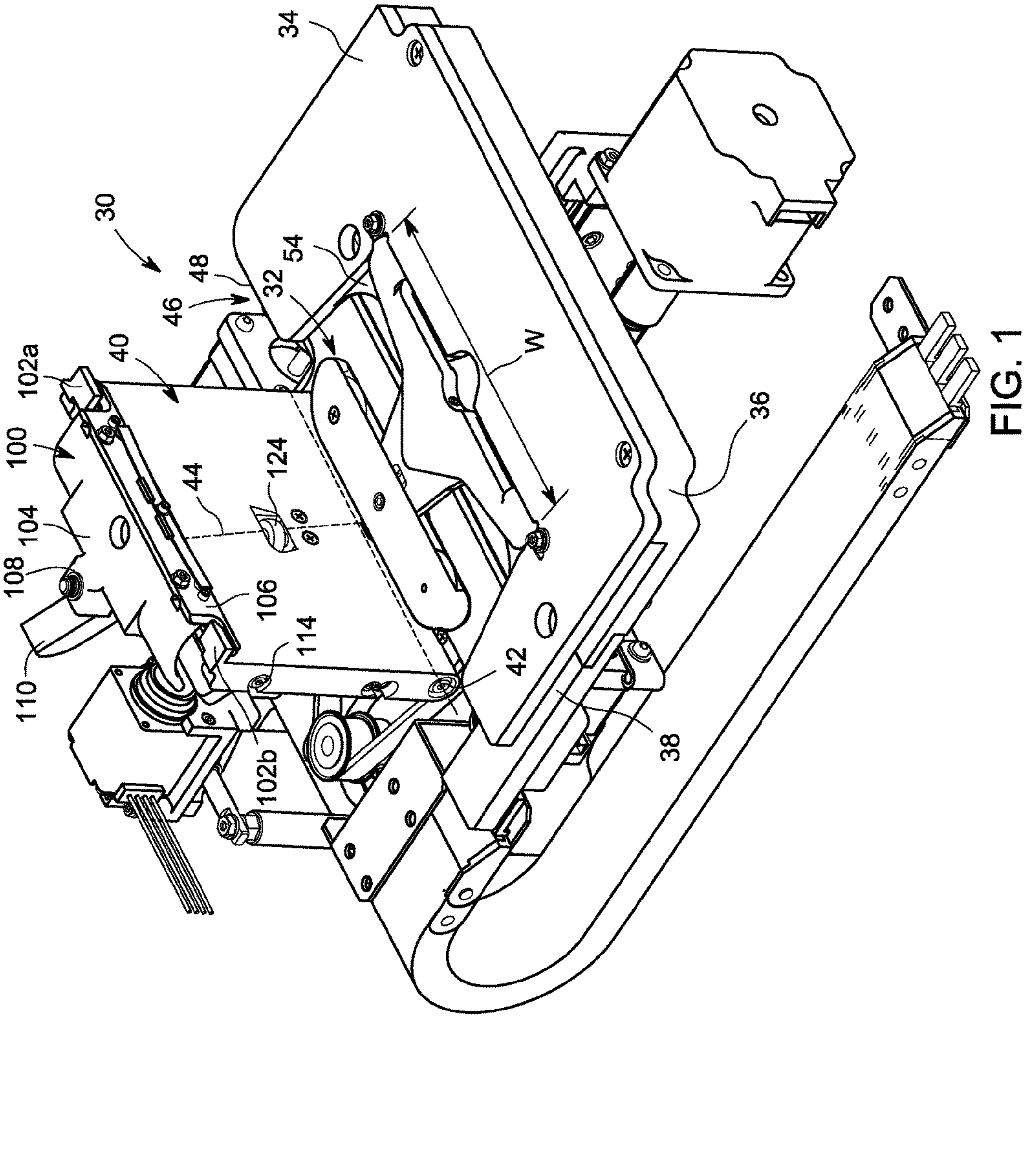
FIG. 1 illustrates a portion of a booklet processing mechanism that includes the spine guidance system described herein.
Figure 2:
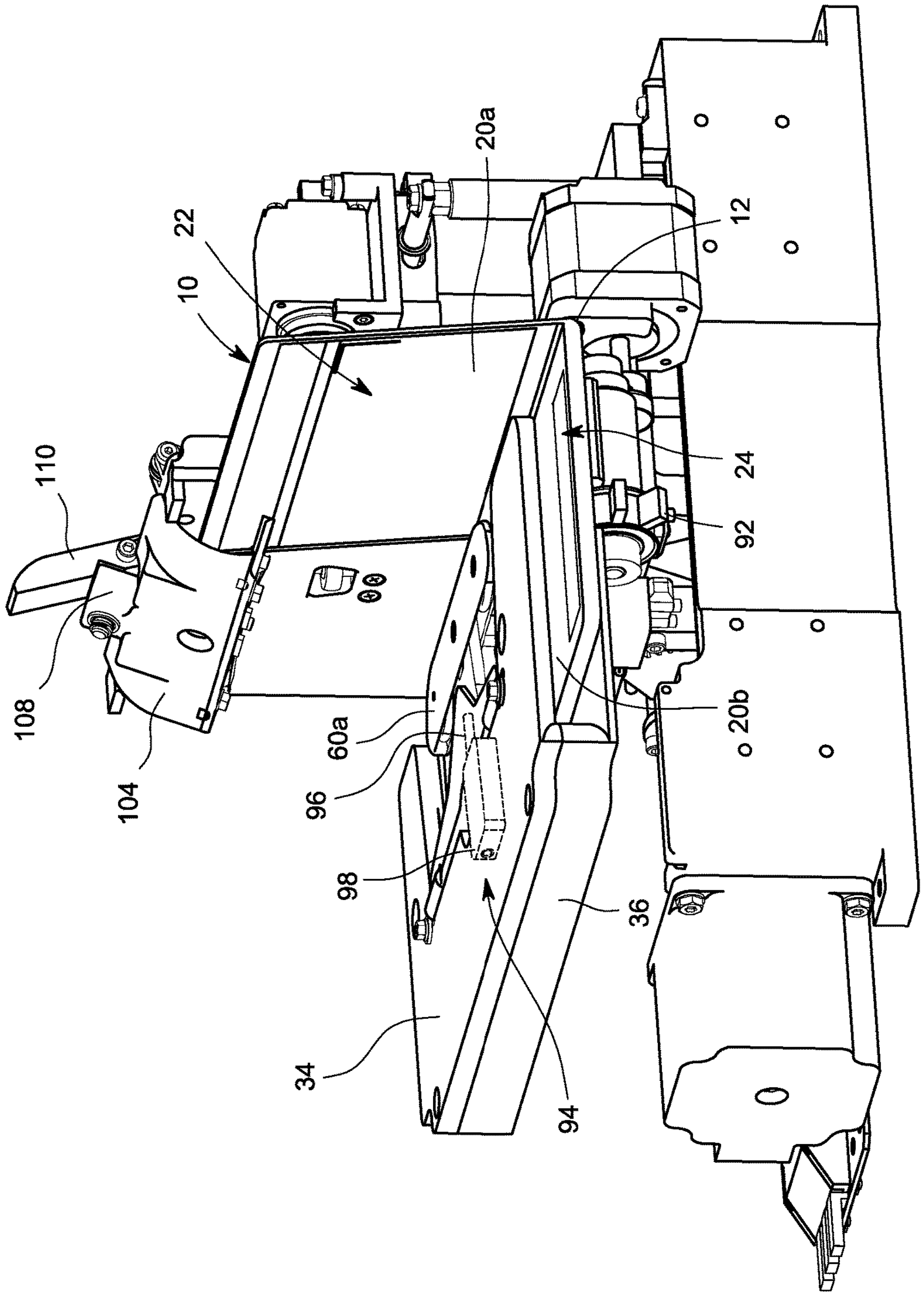
FIG. 2 is a view similar to FIG. 1 but showing a booklet being input into the booklet processing mechanism.
Figure 3:
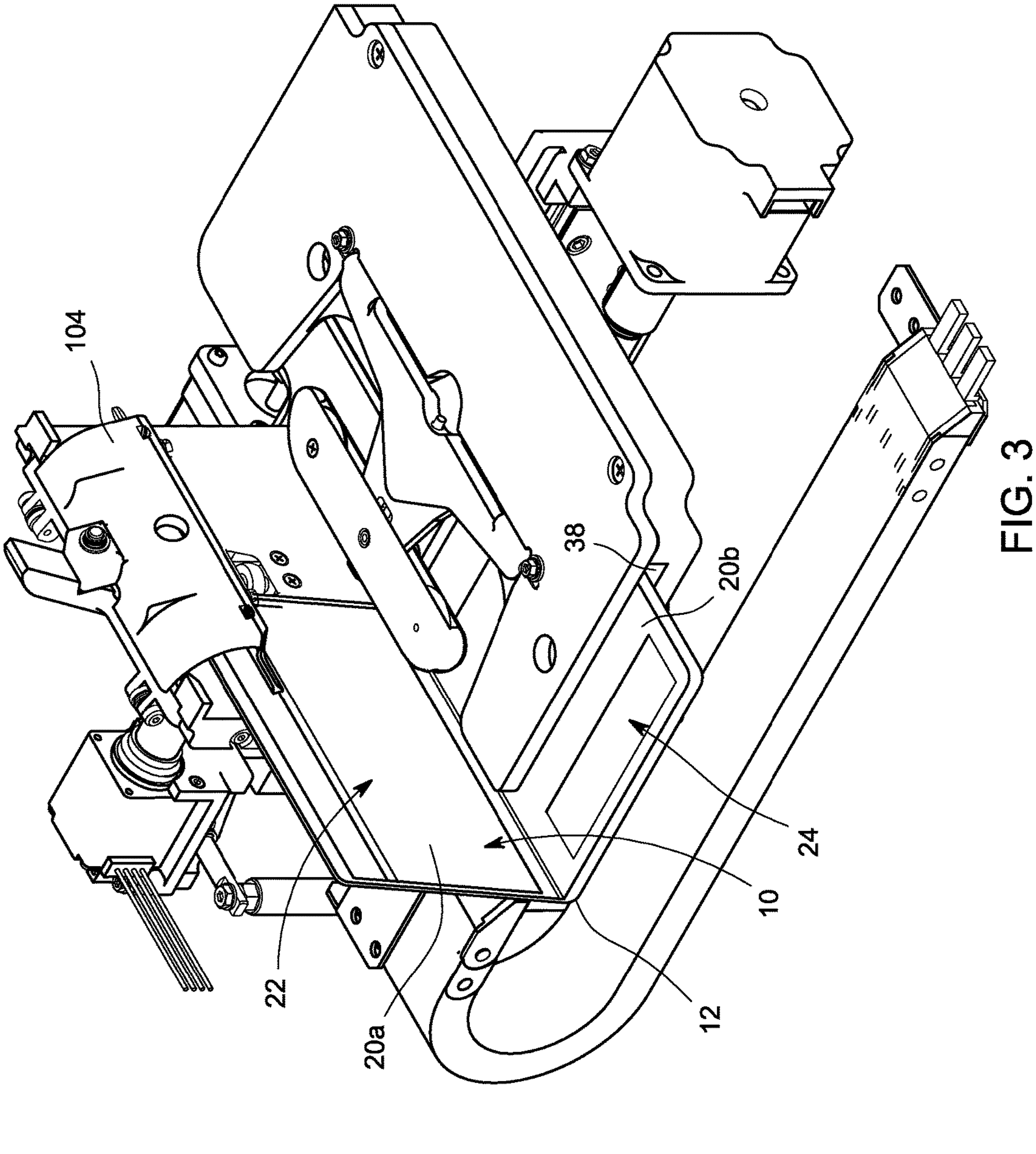
FIG. 3 is a view similar to FIG. 1 but showing a booklet being output from the booklet processing mechanism.

Turning to FIGS. 1-3, a portion of a booklet processing mechanism 30 that includes a spine guidance system 32 is illustrated. FIG. 2 illustrates the opened booklet 10 entering the mechanism 30 through an input side while FIG. 3 illustrates the opened booklet 10 exiting the mechanism 30 through an output side.

Hereinafter, the mechanism 30 will be described as being a laser processing mechanism that employs a laser to process, i.e. personalize, a page of the booklet. However, it is to be understood that the mechanism 30 is not limited to a laser processing mechanism, but can include other booklet processing mechanisms where it is beneficial to securely hold a page of a booklet in the manner described herein. An example of another booklet processing mechanism includes, but is not limited to, a vision verification system.

The mechanism 30 includes a fixed platform 34 that is attached to a base 36. A transport path 38 for the booklet half 24 is defined between the platform 34 and the base 36 so that the booklet half 24 travels underneath the platform 34. The platform 34 and the base 36 are oriented substantially in a horizontal plane in the mechanism 30.

A backing plate 40 is mounted adjacent to a front end of the platform 34. The plate 40 is illustrated in FIGS. 1-3 as being oriented in a vertical plane generally perpendicular to the platform 34. In use, the backing plate 40 supports the booklet half 22 which is pressed against the backing plate. This presents the sheet 20*a* in a substantially vertical plane against the backing plate so that the front page thereof can be lased by a laser system 41 (see FIG. 9). The laser system is suitably mounted adjacent to the platform 34 for projecting laser pulses toward the backing plate 40 and the vertically oriented page of the sheet 20*a* supported thereby in order to perform laser personalization. An example of a suitable laser system is described in U.S. Pat. No. 6,783,067.

Although the backing plate 40 is illustrated and described as being oriented in a vertical plane, the backing plate 40 can be mounted to pivot about a horizontal or MLI axis 42 and/or about a vertical or CLI axis 44. These movements of the backing plate 40 about the axes 42, 44 are useful when MLI/CLI or 3D lasing on the booklet is desired.

With reference to FIG. 2, the booklet 10 is fed in an open condition into the mechanism 30 from the input side from a suitable upstream feed mechanism (not illustrated). The booklet 10 can be opened by a suitable mechanical opening mechanism, an example of which is described in U.S. Pat. No. 6,783,067, or the booklet can be manually opened by a human operator with the opened booklet then being fed by the feed mechanism into the mechanism 30.

When the booklet is fed into the mechanism 30, the booklet half 24 is disposed between the platform 34 and the base 36 in the transport path 38, while the booklet half 22 is generally perpendicular to the booklet half 24. The spine 12 and a portion of the booklet half 22 adjacent to the spine 12 travel in a gap 46 that is formed between a front edge 48 of the platform and the front of the backing plate 40.

The spine guidance system 32 is mounted in the mechanism 30 so as to guide the booklet as it is being input into the mechanism, to apply a force on the booklet half 22 adjacent to the spine 12 in order to hold the portion of the booklet half 22 adjacent to the spine against the backing plate 40 during lasing, and to accommodate different booklet half thicknesses.

Figure 4:
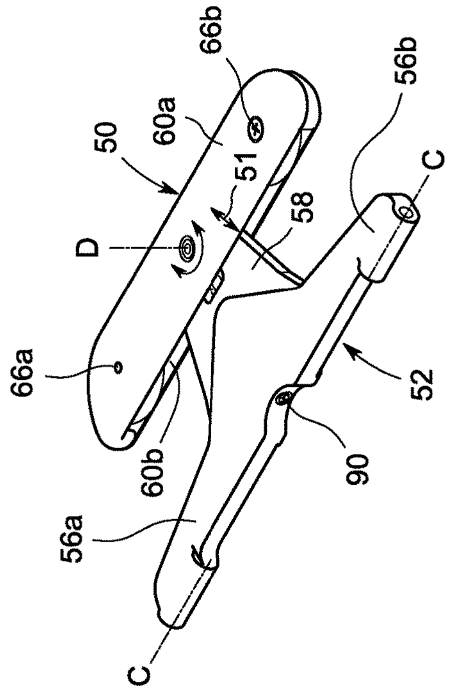
FIG. 4 is a perspective view of the spine guide and mounting bar of the spine guidance system.
Figure 5:
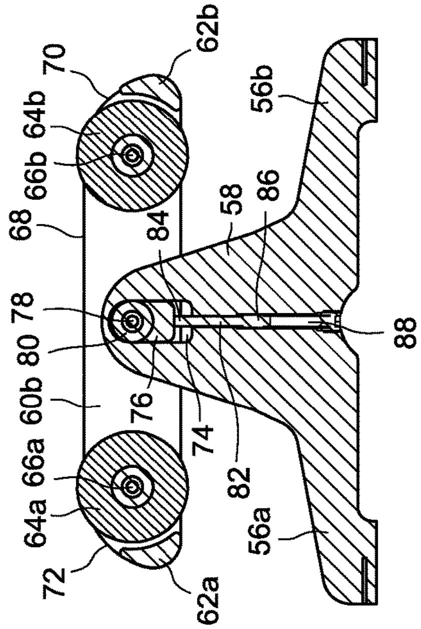
FIG. 5 is a cross-sectional view of the spine guide and mounting bar.

With reference to FIGS. 1 and 4-5, the spine guidance system 32 includes a spine guide 50 and a mounting bar 52. The guidance system 32 is disposed within a cut-out section 54 of the platform. The mounting bar 52 comprises a generally T-shaped structure having a pair of arms 56*a*, 56*b* that extend from a central section 58. The arms 56*a*, 56*b* are pivotally mounted at each end thereof to the platform 34 to allow the mounting bar 52 to be pivoted upward about the axis C-C to a raised position. A biasing mechanism, for example one or more springs, act on the arms 56*a*, 56*b* or other portions of the mounting bar 52 to bias the mounting bar to the position shown in FIG. 1 where the bar 52 (and the spine guide 50 connected thereto) is generally horizontal and level with the upper surface of the platform 34. For example, coil springs can be provided around pivot pins that mount the arms 56*a*, 56*b* to the platform 34 to provide the biasing force. At the biased position shown in FIG. 1, the mounting bar 52 and the spine guide 50 hold the booklet half 24 downward on the base 36.

The width W of the cut-out section 54 is greater than the width of the booklet 10. This permits access to and manual removal of a booklet from the lasing position by pivoting the mounting bar 52, and the spine guide 50 connected thereto, upward to the raised position.

In one embodiment, illustrated in dashed lines in FIG. 2, an optional stop mechanism 94 can be provided to limit rotation of the mounting bar 52 upward about the axis C-C to the raised position. Any stop mechanism that can selectively limit upward rotation of the mounting bar 52 can be used. In the illustrated example, the stop mechanism 94 includes a movable stop 96, such as a solenoid operated shaft, that can be extended and refracted by a solenoid 98. In the extended position shown in FIG. 2, the stop 96 is disposed above the mounting bar 52 to limit its upward rotation. In its retracted position (not shown), the stop 96 is withdrawn from above the mounting bar 52 to allow upward pivoting of the mounting bar about the axis C-C.

As best seen in FIGS. 4 and 5, the spine guide 50 is mounted to the mounting bar 52 so as to be biased in a direction toward the backing plate 40 and to be able to pivot relative to the mounting bar about a vertical axis. The spine guide 50 is designed to be in physical engagement with the booklet half adjacent to the spine 12, and guides the booklet as it is being fed into and from the mechanism 30 and to press the booklet against the backing plate 40. In addition, the pressing force applied by the spine guide helps to retain the booklet at the lasing position. Further, the spine guide 50 can adjust to accommodate different booklet half 22 thicknesses. In addition, the spine guide 50 presses on the booklet half 22 to provide some friction to prevent the booklet from coasting past its intended lasing position during feeding of a booklet into position.

The spine guide 50 can have any construction suitable for performing the functions of the spine guide described herein. For example, the spine guide 50 is illustrated as having a pair of mounting plates 60*a*, 60*b* that are spaced from one another by a pair of spacers 62*a*, 62*b*. A pair of thin rollers 64*a*, 64*b* are rotatably mounted between the plates 60*a*, 60*b* on each side of the central section 58 via axles 66*a*, 66*b* so that the rollers 64*a*, 64*b* can freely rotate. The rollers 64*a*, 64*b* are designed to roll along the surface of the page of the booklet as the booklet is fed into and from the mechanism 30. Since the rollers and other elements of the spine guide 50 engage with the booklet, the construction and materials of the spine guide 50 should be selected to avoid damaging or marring the sheets engaged thereby. For example, the rollers 64*a*, 64*b* can be made of any suitable material that avoids damaging or marring the booklet page, for example rubber, plastic, or any other low abrasion material. Likewise, the plates 60*a*, 60*b*, or portions thereof that in use contact the booklet, can be made of a smooth plastic or other low abrasion material such as hard coated aluminum.

As best seen in FIG. 5, the rollers 64*a*, 64*b* have a diameter such that the rollers extend slightly beyond a front edge 68 of the plates 60*a*, 60*b* to permit engagement with the booklet half 22. An input side 70 of the plates 60*a*, 60*b* and spacer 62*b* are gradually curved, as is an output side 72. This curvature of the input side 70 and the output side 72 helps to guide the booklet into and from the mechanism 30.

The spine guide 50 is pivotally mounted at its center to the end of the central section 58 of the mounting bar 52 to permit the spine guide to pivot about the axis D shown in FIG. 4. In addition, when the backing plate 40 is vertical, the axis D and the CLI axis 44 are generally parallel to each other and lie on a common vertical plane. The end of the central section 58 includes a slot 74 formed therein, with a slide block 76 slidably disposed in the slot 74 for movement in directions toward and away from the backing plate 40. A vertical axle 78 interconnects the plates 60*a*, 60*b*, with the axle being rotatably supported by a bearing 80 that is slidably disposed within the slot 74 and engaged with the slide block 76.

A biasing mechanism acts on the slide block 76 to bias the slide block 76 and the bearing 80, and thus the spine guide 50 as a whole, in a direction toward the backing plate 40. In the illustrated example, the biasing mechanism includes a pin 82 that is disposed within a hole formed in the central section 58 and has one end 84 engaged with the slide block 76. A second end 86 of the pin 82 is engaged with a spring 88, such as a coil spring, that is disposed within the hole between the pin and a removable insert 90.

As a result, the spine guide 50 as a whole is moveable in the direction of the arrows 51 shown in FIG. 4 in a direction toward and away from the backing plate 40 perpendicular to the axis D. This permits the spine guide to accommodate different booklet half 22 thicknesses.

As best seen in FIG. 2, the top surface of the mounting plate 60*a* is approximately level with the surface of the platform 34. Thus, the spine guide 50 has a low vertical height that allows it to guide and bias the booklet adjacent to the spine without obstructing the laser. Therefore, the laser is able to perform laser personalization on the necessary portions of the booklet without obstruction by the spine guide.

Returning to FIG. 1, a guide and clamp mechanism 100 can be provided at the top of the backing plate 40 to guide and clamp the free upper edge of the booklet half 22 during lasing. The guide and clamp mechanism 100 can have a construction as described in U.S. Patent Application Ser. No. 61/692,975, titled "Booklet Guide And Clamp System In A Booklet Processing Mechanism", filed on Aug. 24, 2012, which is incorporated herein by reference in its entirety. However, the mechanism 100 can have other constructions, such as the construction disclosed in U.S. Pat. No. 6,783,067.

A pair of stops 102*a*, 102*b* at the top of the backing plate 40 provide a uniform reference point that the booklet is aligned to when in the lasing position.

Figure 10:
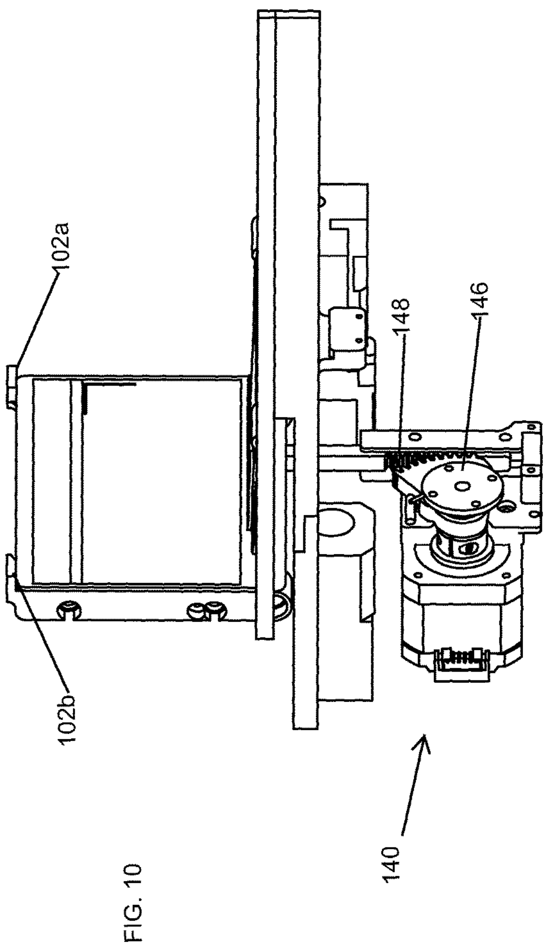
FIG. 10 shows a bottom perspective view of another embodiment of a portion of a booklet processing mechanism that has a lifting mechanism.
Figure 11:
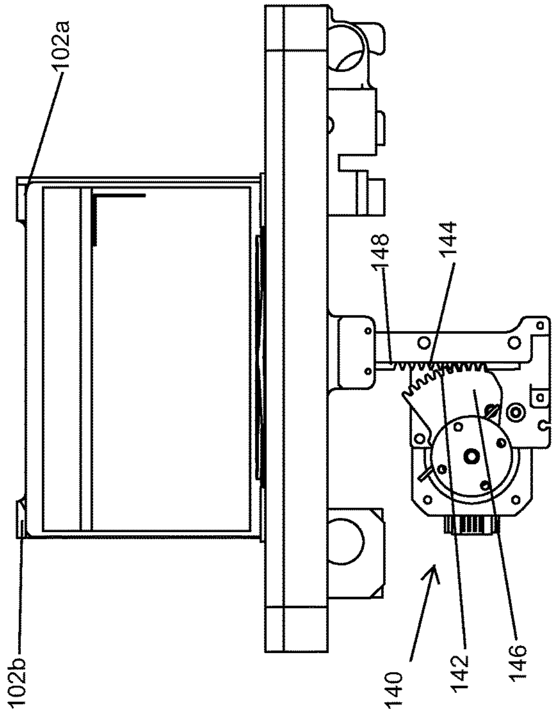
FIG. 11 shows a side view of the lifting mechanism from FIG. 10.

In some embodiments, a booklet processing mechanism, such as but not limited to the booklet processing mechanism 30, includes a lifting mechanism. With reference to FIGS. 10 and 11, one embodiment of a lifting mechanism 140 is illustrated. The lifting mechanism 140 is configured lift the spine 12, such as in one example by pushing up on the spine 12 from underneath the booklet. The lifting mechanism 140 can help aid in the alignment of the booklet, e.g. booklet half 22, to upper edge stops 102*a* and 102*b*.

In one example, such as shown in FIGS. 10 and 11, the lifting mechanism 140 is constructed as a jack-type structure with cooperating ratchet teeth 142, 144 respectively disposed on rotatable portion 146 and movable contact member 148. The movable contact member 148 can be moved by way of interaction of the ratchet teeth 142, 144 to move the movable contact member to contact the spine 12 and push the spine 12 to align the booklet to the upper edge stops 102*a* and 102*b*. It will be appreciated that the specific construction of the lifting mechanism 140 shown in FIGS. 10 and 11 is not meant to be limiting as any suitable lifting mechanism may be employed that can lift the spine 12.

As described further in U.S. Patent Application Ser. No. 61/692,975, titled "Booklet Guide And Clamp System In A Booklet Processing Mechanism", the guide and clamp mechanism 100 is mounted on the backing plate 40 for movement relative to the backing plate between a first, guiding position (FIGS. 2-3) at which the guide and clamp mechanism 100 is spaced from the backing plate to guide the booklet half 22 during input and output of the booklet 10, and a second, clamping position (FIGS. 1 and 7-9) at which the guide and clamp mechanism 100 is closer to the backing plate to clamp the free or upper edge of the booklet half 22 against the backing plate during lasing. In addition, an actuating mechanism is connected to the guide and clamp mechanism 100 that actuates the guide and clamp mechanism between the first position and the second position.

In the illustrated embodiment, the guide and clamp mechanism 100 is shown and described as being rotatably mounted to the backing plate 40 so that the guide and clamp mechanism 100 rotates as it moves between the first and second positions. However, other mounting arrangements for the guide and clamp mechanism 100 could be provided, for example such that the mechanism 100 moves in linear directions toward and away from the backing plate between the first and second positions, without rotating.

With reference to FIGS. 1-3, the illustrated guide and clamp mechanism 50 includes a mount 104. A guide/clamp structure 106 is mounted at a front end of the mount 54 via screws or the like. The guide/clamp structure 106 is designed to guide the upper, free end of the booklet half 22 as the booklet is input and discharged from the mechanism 30, as well as engage the booklet half 22 to clamp the upper, free end to the backing plate 40. Because the guide/clamp structure 106 physically engages the booklet 10, the construction and materials of any portions of the guide/clamp structure 106 that contact the booklet should be selected to avoid damaging or marring the sheets engaged thereby. For example, the guide/clamp structure 106 can be made of any suitable material that avoids damaging or marring the booklet page, for example rubber, plastic, or any other low abrasion material.

Figure 7:
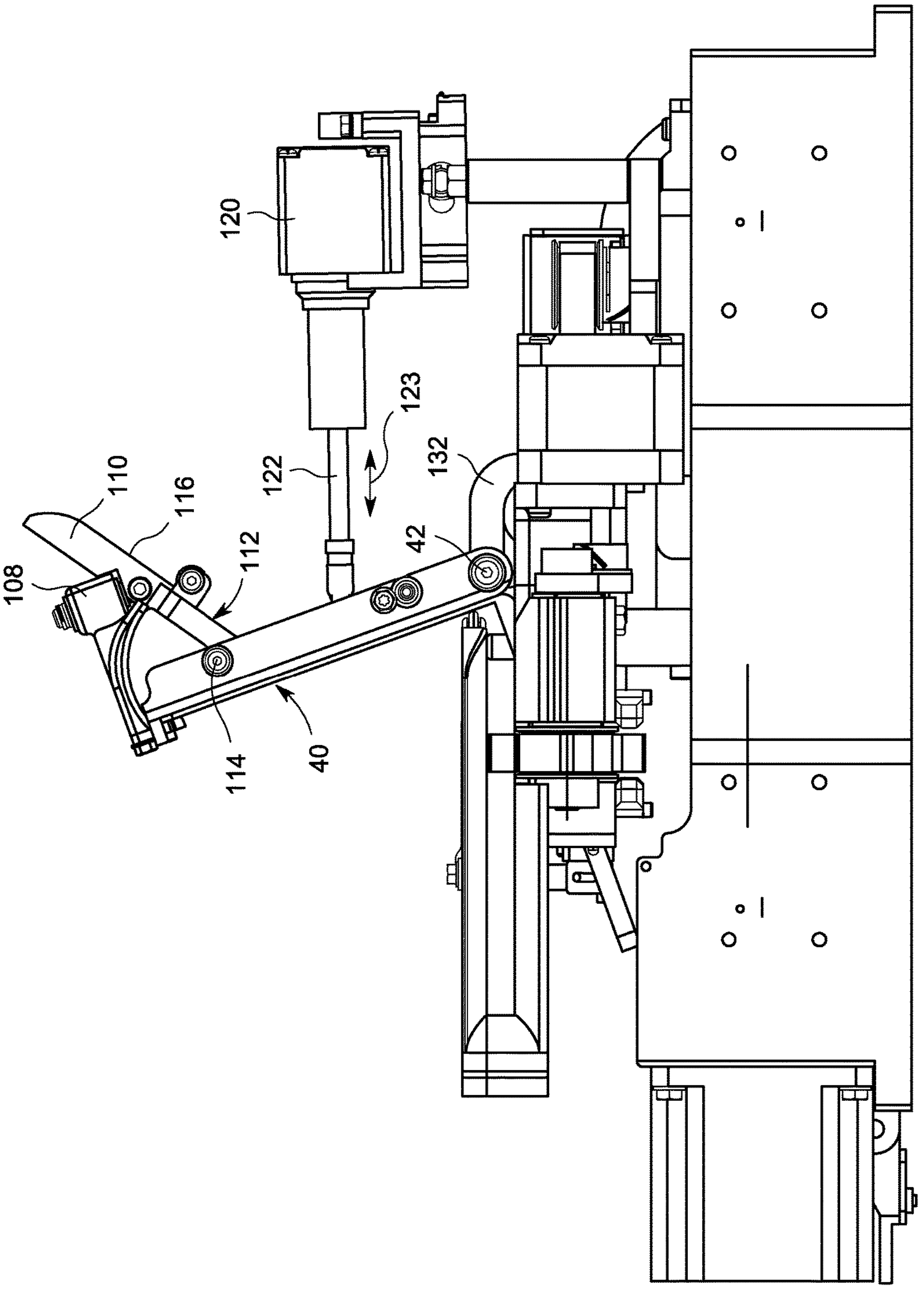
FIG. 7 illustrates the backing plate tilted about the MLI axis for an MLI laser operation.
Figure 9:
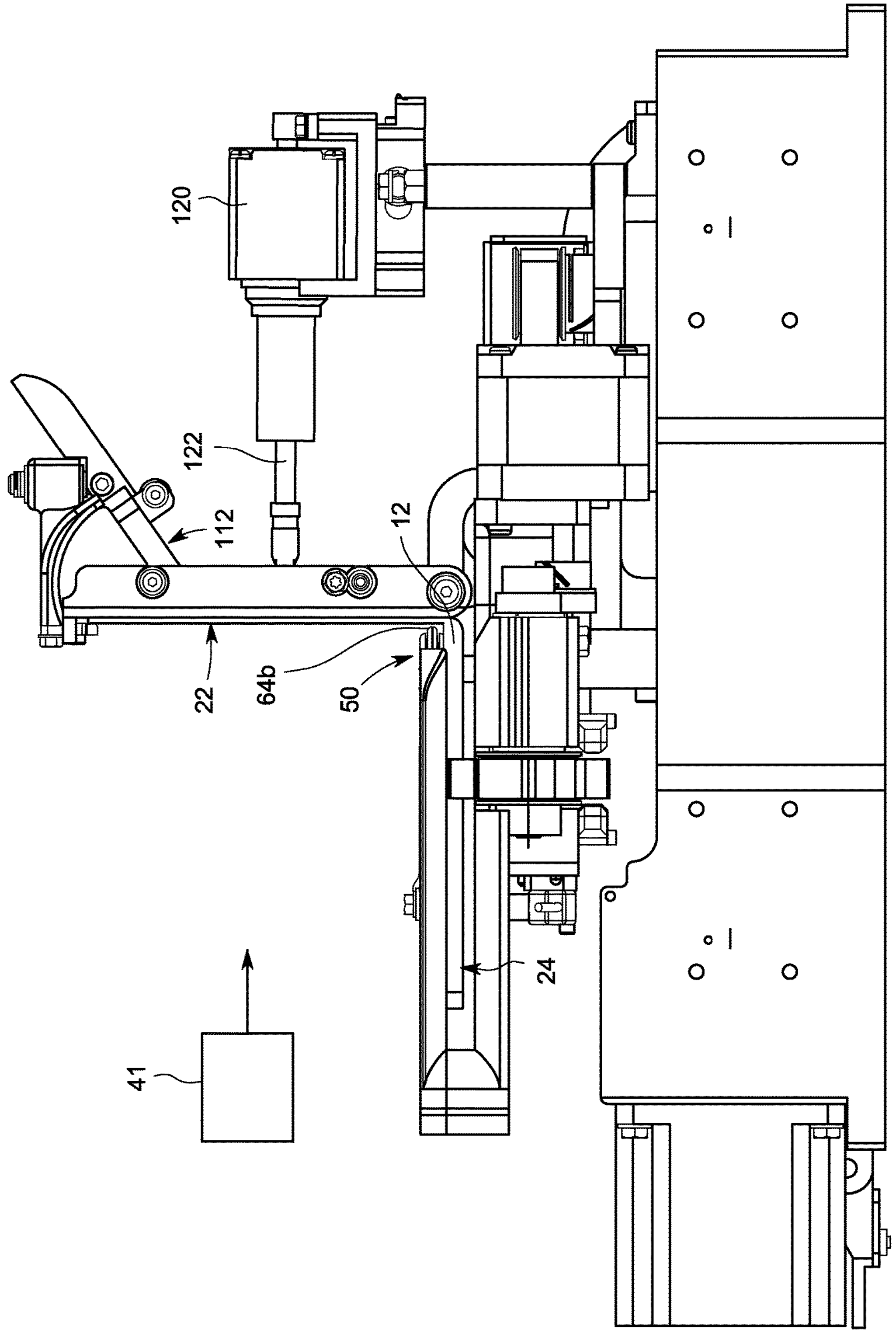
FIG. 9 is a side view of the booklet processing mechanism showing the booklet in its processing position and pressed against the backing plate.

A rear end of the mount 104 includes a mounting block 108 with a hole extending through the block. As best shown in FIGS. 7 and 9, the mounting block 108 is attached to an arm 110 of a rotating mount 112. The block 108 is attached to the arm 110 via a pivot that permits the entire guide and clamp mechanism 100 to pivot relative to the arm 110 and the rotating mount 112 about an axis A-A of the pivot (i.e. about the axis of the hole in the block 108 parallel to the axis 44).

The rotating mount 112 is rotatably mounted to the backing plate by pivot mounts 114 (FIGS. 1 and 7). One or more biasing members are connected to the rotating mount 112 to bias the rotating mount 112 in a clockwise direction when viewing FIGS. 7 and 9, which biases the guide and clamp mechanism 100 toward the clamping position shown in FIGS. 1 and 7-9 from the guiding position shown in FIG. 2-3. Any form and number of biasing member(s) can be used as long as the rotating mount 112 and the guide and clamp mechanism 100 are biased in the manner discussed above.

An actuating mechanism is suitably connected to the guide and clamp mechanism 100 to actuate the guide and clamp mechanism between the first position and the second position. As described further in U.S. Patent Application Ser. No. 61/692,975, titled "Booklet Guide And Clamp System In A Booklet Processing Mechanism", the actuating mechanism comprises an actuating motor that rotates an output block having a link arm fixed thereto. The end of the link arm includes a cam roller mounted thereto that, when the link arm is rotated in one direction, rolls along a bottom side 116 of the arm 110 to force the arm 110 up to the position shown in FIGS. 2-3, which causes the mechanism 100 to rotate to the guide position. The bias of the biasing member (s) maintains the bottom side 116 of the arm 110 in engagement with the cam roller for controlled movements. When the link arm is rotated in the opposite direction, the biasing force of the biasing member(s) lowers the arm 110 to the position shown in FIG. 1 which causes the mechanism 100 to rotate to the clamping position.

At the first position shown in FIGS. 2-3, the guide/clamp structure 106 of the guide and clamp mechanism 100 is spaced away from the backing plate 40 a sufficient distance to permit entry of the upper, free edge of the booklet half 22 between the guide/clamp structure 106 and the backing plate 40 during input of a booklet to be lased.

Figure 8:
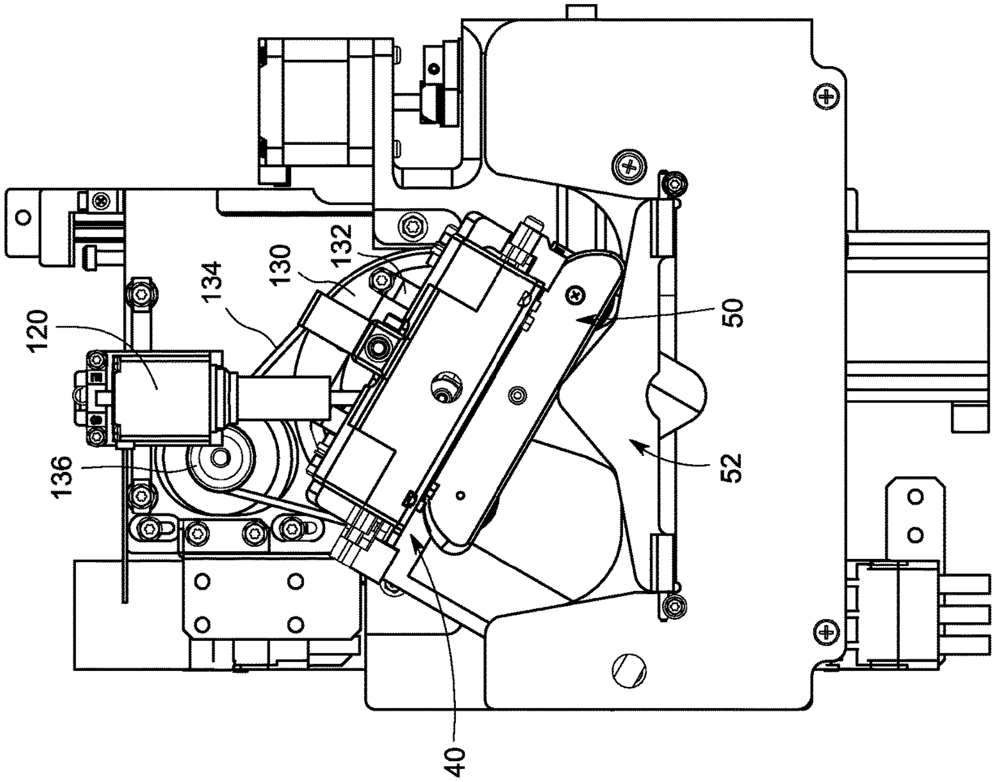
FIG. 8 illustrates the backing plate tilted about the CLI axis for a CLI laser operation.

Once the booklet is in lasing position, the guide and clamp mechanism 100 is rotated by the actuating mechanism to the position shown in FIGS. 1 and 7-9. At the second position, the guide/clamp structure 106 is moved closer to the backing plate 40, in particular close enough so that the upper, free edge of the booklet half 22 is clamped between the guide/clamp structure 106 and the backing plate 40 to securely hold the booklet at the lasing position as best seen in FIG. 8. As evident from FIGS. 1 and 7-9, the guide/clamp structure 106 is adjacent to the top edge of the backing plate so that the guide/clamp structure 106 is out of the way and does not interfere with the laser during a lasing operation.

Once lasing is completed, the guide and clamp mechanism 100 is actuated by the actuating mechanism back to the first position shown in FIGS. 2-3. The booklet is then transported out of the mechanism 30.

As indicated above, the backing plate 40 can be mounted to pivot about the horizontal axis 42 and/or about the vertical axis 44, which is useful when MLI/CLI lasing on the booklet is desired. With reference to FIGS. 7-9, pivoting of the backing plate 40 about the horizontal or MLI axis 42 is achieved using an actuator 120. The actuator 120 includes a shaft 122 that can extend and retract in the direction of the arrows 123 shown in FIG. 7 (i.e. toward and away from the backing plate). The end of the shaft 122 is fixed to a pin via a spherical bearing 124 (FIG. 1). The pin is fixed to the backing plate 40. When the shaft 122 extends and retracts, the backing plate pivots about the axis 42. Since the guide and clamp mechanism 100 is mounted on the backing plate, it pivots with the backing plate about the axis 42.

In addition, as best seen in FIG. 8, the backing plate 40 is mounted on a rotatable turret 130 via legs 132. The turret 130 is rotatable about a vertical axis to rotate the backing plate about the vertical CLI axis 44. The turret 130 is rotated via a drive belt 134 that is driven by a pulley 136 connected to the output shaft of a reversible actuator, for example an electric motor. When the actuator rotates the pulley 136, the turret 130 is rotated which in turn rotates the backing plate and all elements mounted thereon about the vertical CLI axis 44.

In use of the mechanism 30, with reference initially to FIG. 2, an opened booklet 10 is fed into the mechanism through the input side from the upstream feed mechanism (not illustrated). The booklet half 24 is disposed between the platform 34 and the base 36 in the transport path 38, while the booklet half 22 is generally perpendicular to the booklet half 24. The spine 12 and the portion of the booklet half 22 adjacent to the spine 12 travel in the gap 46 between the front edge of the platform and the front of the backing plate 40. The upper free edge of the booklet half 22 is guided between the mechanism 100 and the backing plate 40.

The upstream feed mechanism partially feeds the booklet into the mechanism 30, with a tabbed transport belt 92 picking up the booklet from the upstream feed mechanism and continuing feeding of the booklet into and through the mechanism 30. The feeding and transport of booklets into, through and from a laser personalization mechanism is well known in the art.

The curved input side 70 of the spine guide 50 helps to guide the booklet half 22 and begins pressing the booklet half 22 toward the backing plate 40. The spring bias on the spine guide allows the spine guide to move toward or away from the backing plate 40 to accommodate different booklet half 22 thicknesses.

The transport belt 92 transports the booklet until the booklet half 22 is substantially centered on the backing plate 40 which is the lasing position (FIG. 9). In this position, the spine guidance system 32 is disposed over and biased downward into engagement with the booklet half 24 to help hold the booklet half 24 down. At the same time, the spine guide 50 is biasing the portion of the booklet half 22 adjacent to the spine against the backing plate, and the mechanism 100 is actuated to clamp the upper free end of the booklet half 22 against the backing plate. Therefore, the booklet is securely held at the lasing position to perform lasing on the page of the sheet 20*a*.

As described above, the backing plate 40 is tiltable about the axes 42, 44 for MLI/CLI lasing. In one embodiment, the backing plate can tilt about 30 degrees in either direction about the CLI axis 44. As shown in FIG. 8, the titling of the backing plate about the axis 44 is followed by the spine guide 50 which pivots about the vertical axis D with the backing plate when it pivots about the axis 44. The booklet moves with the backing plate 40 when it tilts about the CLI axis 44. To permit the booklet to move with the backing plate when it tilts, the tab belt 92 reverses in order to get the tab thereon out of the way so that it does not interfere with rotation of the booklet. Therefore, the longitudinal axis of the spine guide is maintained parallel to the MLI pivot axis 42 of the backing plate at all times.

Further, the spine guide 50 can pivot about the axis C-C via the mounting bar 52 to follow pivoting of the backing plate about the MLI pivot axis 42 as shown in FIG. 7.

After lasing is completed, the booklet is transported by the tabbed transport belt 92 to exit the mechanism 30 through the output side as shown in FIG. 3.

Although a particular spine guide 50 mechanism has been illustrated in the drawings and described, other spine guide constructions are possible. The spine guide 50 can have any construction that has a low vertical profile so that it resides below the field of the laser or other processing mechanism to avoid obstructing the processing operation, helps to guide a booklet into and from a processing position, helps to prevent the booklet from coasting past the processing position during input, accommodates different booklet half thicknesses, biases the portion of the booklet half adjacent to the spine against the backing plate, and when MLI/CLI lasing capability is provided, can pivot about a vertical CLI axis and a horizontal MLI axis to follow movements of the backing plate.

The embodiments disclosed in this application are to be considered in all respects as illustrative and not limitative. The scope of the claimed invention is indicated by any appended claims rather than by the foregoing description, and all changes which come within the meaning and range of equivalency of the claims are intended to be embraced therein.

The invention claimed is:

1. A booklet processing mechanism configured to process a booklet having a spine, comprising:
- a backing plate;
- a spine guidance system that includes a spine guide that is configured to engage a booklet half of the booklet adjacent to the spine to bias the booklet half into engagement with the backing plate, the spine guide being moveable toward and away from the backing plate, the spine guide is biased in a direction toward the backing plate, and the spine guide is pivotable about a horizontal axis;
- the backing plate includes an upper edge and a lower edge; and the spine guide is positioned adjacent to and faces the lower edge; and
- the backing plate is pivotable along the lower edge about a horizontal axis, and the backing plate is pivotable about a first vertical axis; and the spine guide is pivotable about a second vertical axis.

2. The booklet processing mechanism of claim 1, further comprising a horizontal platform, and the spine guide is mounted on the horizontal platform;
- a cut-out section formed in the horizontal platform, the spine guide is mounted in the cut-out section, and the cut-out section has a width greater than a width of the booklet to be processed; and
- a transport path defined under the horizontal platform in which one half of the booklet to be processed can travel.

3. The booklet processing mechanism of claim 2, wherein the spine guide includes a top surface that is approximately level with a top surface of the horizontal platform.

4. The booklet processing mechanism of claim 1, wherein the spine guide has an input side and an output side, and the input side and the output side are curved.

5. The booklet processing mechanism of claim 1, further comprising a processing mechanism that performs a processing operation; and
- the spine guide is positioned and configured to reside below a field of the processing mechanism to avoid obstructing the processing operation, the spine guide is positioned and configured to guide a booklet into and from a processing position, the spine guide is configured to prevent the booklet from coasting past the processing position during input, and the spine guide is pivotable about a vertical axis.

6. The booklet processing mechanism of claim 1, wherein the spine guide is pivotally mounted adjacent to a center thereof.

7. The booklet processing mechanism of claim 6, wherein the spine guide includes a pair of rollers each of which is rotatably mounted for rotation about a vertical axis, and the rollers are disposed on opposites sides of the vertical pivot axis.

8. The booklet processing mechanism of claim 1, wherein the horizontal axis is parallel to the backing plate.

9. A passport processing mechanism configured to process a passport having a spine, comprising:

a backing plate that in use supports a first half of the passport;

a platform that defines a transport path in which during use a second half of the passport is disposed;

a spine guidance system mounted on the platform, the spine guidance system includes a spine guide that is configured to engage the first half of the passport adjacent to the spine to bias the first half into engagement with the backing plate, the spine guide being moveable toward and away from the backing plate, and the spine guide is biased in a direction toward the backing plate, and the spine guide is pivotable about a horizontal axis;

the spine guide is pivotally mounted adjacent to a center thereof to permit the spine guide to pivot about a vertical pivot axis; and a processing mechanism that performs a processing operation on the passport.

10. The passport processing mechanism of claim 9, wherein the spine guide is also engaged with the second half of the passport.

11. The passport processing mechanism of claim 10, further comprising a cut-out section formed in the platform, the spine guide is mounted in the cut-out section, and the cut-out section has a width greater than a width of the booklet to be processed.

12. The passport processing mechanism of claim 9, wherein the backing plate includes an upper edge and a lower edge; the spine guide is positioned adjacent to and faces the lower edge.

13. The passport processing mechanism of claim 9, wherein the spine guide has an input side and an output side, and the input side and the output side are curved.

14. The passport processing mechanism of claim 9, wherein the spine guide includes a top surface that is approximately level with a top surface of the platform.

15. The passport processing mechanism of claim 9, wherein the processing mechanism is arranged to perform a processing operation on the first half of the passport.

16. The passport processing mechanism of claim 9, wherein the spine guide includes a pair of rollers each of which is rotatably mounted for rotation about a vertical axis, and the rollers are disposed on opposites sides of the vertical pivot axis.

17. A booklet processing mechanism configured to process a booklet having a spine comprising:

a backing plate;

a spine guidance system that includes a spine guide that is configured to engage a booklet half of the booklet adjacent to the spine to bias the booklet half into engagement with the backing plate, the spine guide being moveable toward and away from the backing plate, the spine guide is biased in a direction toward the backing plate, and the spine guide is pivotable about a horizontal axis;

the backing plate includes an upper edge and a lower edge; and the spine guide is positioned adjacent to and faces the lower edge; and the spine guide is pivotally mounted adjacent to a center thereof to permit the spine guide to pivot about a vertical pivot axis.

18. A booklet processing mechanism configured to process a booklet having a spine, comprising:

a backing plate;

a spine guidance system that includes a spine guide that is configured to engage a booklet half of the booklet adjacent to the spine to bias the booklet half into engagement with the backing plate, the spine guide being moveable toward and away from the backing plate, the spine guide is biased in a direction toward the backing plate, and the spine guide is pivotable about a horizontal axis;

the backing plate includes an upper edge and a lower edge; and the spine guide is positioned adjacent to and faces the lower edge; and the spine guide has an input side and an output side, and the input side and the output side are curved.

* * * * *